2,977,350

POLYMERIZATION OF OLEFINS

Egi Victor Fasce and Joseph Kern Mertzweiller, Baton Rouge, La., assignors to Esso Research and Engineering Company, a corporation of Delaware No Drawing. Filed June 14, 1956, Ser. No. 591,261

9 Claims. (Cl. 260—94.9)

The present invention relates to the polymerization of olefins. More particularly, the invention pertains to the polymerization of olefins at relatively low pressures for the production of high molecular weight olefin polymers of improved properties and to improvements of the polymerization process.

In one of its aspects, the invention involves the polymerization of low molecular weight olefins, particularly ethylene and propylene to polymers, such as polyethylene or polypropylene of high molecular weight, at relatively low pressures in the presence of a reduced polyvalent metal compound as the catalyst, particularly in the presence of catalysts obtained by reacting a reducing metal-containing material with a reducible heavy metal compound and carrying out the polymerization reaction in the presence of carefully controlled amounts of straight-chain alpha olefins having a molecular weight higher than the olefin to be polymerized.

Prior to the present invention it has been found that ethylene and other olefins may be polymerized at relatively low pressures not substantially exceeding atmospheric pressure when using various combinations of aluminum compounds, such as aluminum hydride, aluminum alkyls, e.g. trialkyls, alkyl aluminum halides, etc., with various reducible heavy metal compounds, such as the halides, acetyl acetonates, etc., of the metals of groups IV–IV and VIII of the periodic system, e.g. of titanium, zirconium and iron. Also pre-reduced heavy metal compounds of this type have been used in the absence of aluminum compounds or other reducing agents. Among the most active types of catalyst for this reaction are combinations of trialkyl aluminum or dialkyl aluminum halide with titanium tetrahalide. More specifically, excellent results have been obtained when using combinations of triethyl aluminum or diethyl aluminum chloride with titanium tetrachloride, obtained by simply mixing the catalyst components at atmospheric temperature in suitable solvents. These catalysts have been found to afford high yields of good quality, high molecular weight, solid high softening point polymers of ethylene and other olefins even at pressures as low as, or closely approaching, atmospheric pressure. For example, catalyst efficiencies up to 200 g., and more, of polymer/gram of catalyst have been attained with ethylene, when operating in the presence of inert liquid diluent. Normally paraffinic hydrocarbons boiling in the $C_5$–$C_{15}$ range are used in this process.

The molecular weight of the polymers so produced may fall within the wide range of from about 2,000 to 300,000 and as high as 3,000,000 and more as determined by the intrinsic viscosity method using the I. Harris Correlation (J. Polymer Science, 8, 361 (1952)). Specific molecular weights obtained depend on a multitude of process variables, many of which are interdependent.

A difficulty common to all low pressure olefin polymerization processes is the formation of an extremely heavy slurry of polymer in the liquid reaction medium at commercially desirable product polymer concentrations of 10 to 25%. Such a heavy slurry of often butter-like consistency is difficult to handle; it is conducive to equipment fouling, polymer film formation on equipment walls and loss of heat transfer efficiency. Also, the slurry is extremely difficult to stir, which interferes with proper process control. Frequent shut-downs in continuous operation and serious limitations of the run length of batch processes are the result. These drawbacks detrimentally affect the economy of the type of low pressure polymerization process here involved.

The present invention overcomes, or at least greatly alleviates, these drawbacks and affords various other advantages as will appear from the subsequent description of the invention.

It has now been found that the addition of small concentrations of certain straight-chain alpha olefins of relatively high molecular weight to the polymerization mixture results in a substantial reduction of slurry thickness to a consistency facilitating slurry handling and stirring and eliminating equipment fouling and polymer film formation on equipment walls. It has also been found that slurry thickness is related to the bulk density of the dry product polymer, i.e. the heavier or thicker the slurry, the lower is the bulk density of the dry product polymer and vice versa. This relationship probably is tied to the relationship between slurry solids particle size and slurry thickness, the latter increasing as solids particle size increases. In any case, the relationship exists and permits a quantitative evaluation of slurry thickness. Thus, experience has shown that for smooth operation and efficient process control the slurry thickness should be at least, and preferably exceed, that corresponding to a product polymer bulk density of 0.2. Conventional low pressure ethylene polymerization leads to slurry thicknesses corresponding to dry polymer bulk densities generally not exceeding 0.1 and frequently even less than 0.08. In accordance with the invention it is possible to reduce slurry thickness to values corresponding to dry polymer bulk densities in the vicinity of 0.3, particularly in the case of ethylene polymerization.

The straight chain alpha-olefins useful for the purposes of the present invention generally may have 4 to 18 carbon atoms per molecule, the range of 4 to 14 carbon atoms being preferred. Best results in most respects are obtained when using straight chain alpha-olefins having 6 to 14 carbon atoms, such as hexene-1, octene-1, tetradecene-1, etc., of which octene-1 has been found most desirable particularly for slurry control in ethylene and propylene polymerization.

The amount of added olefin to be used is generally in the range of about 0.01 to 3.0% based on liquid diluent. Within this broad range of general applicability, excellent results are obtained at about 0.1 to 1.5% concentration of added olefin. At these conditions molecular weight of the product polymer is little, if at all, affected nor is there any appreciable effect on polymerization reaction rate.

The added olefins of the invention appear to promote the formation of small amounts of relatively low molecular weight (e.g. $<10,000$) more soluble polymers. This is particularly apparent when the added olefins are used in relatively high concentrations of, say, 1 to 3% based on diluent. Experimental data indicate that the presence of soluble polymer fractions tends to decrease reactor fouling.

The modifying olefins added in accordance with the invention may be used in pure, concentrated or dilute form together with inert paraffinic diluent. The olefins may be added to the polymerization mixture continuously or intermittently or together with the olefin to be polymerized, for example, by saturating the normally gaseous polymerization feed with the normally liquid olefin to be added. However, addition of the modifying olefin to the diluent feed, which is usually in the liquid state, is preferred. The same method may be used when the feed olefin is predissolved in the normally liquid reaction diluent or solvent. The higher molecular weight modifying olefins in the amounts here involved are readily soluble in solvents for ethylene and similar olefins. In all cases it is desirable that the modifying olefins be present before the polymerization reaction starts.

In all other respects, catalyst composition and preparation as well as polymerization conditions may be those heretofore used in the specific art of low pressure olefin polymerization. Thus, a list of reducing catalyst components of outstanding utility includes the following aluminum compounds: tri-isobutyl aluminum, tripropyl aluminum and triethyl aluminum. Useful aluminum compounds of somewhat lower reducing activity include the following: dimethyl aluminum halides, trimethyl aluminum, higher dialkyl aluminum halides and trialkyl aluminum compounds having alkyl groups higher than about $C_{10}$. Mixtures of aluminum alkyls can also be used to reduce the heavy metal compounds. For example, mixtures containing ethyl aluminum dichloride and diethyl aluminum chloride have been successfully used to produce active catalysts in this manner. Similarly, mixtures of diethyl aluminum chloride and triethyl aluminum can be used. All these compounds as well as methods for their preparation are well known in the art. Quite generally, in addition to trialkyl or aryl aluminum compounds, organo-aluminum compounds carrying two hydrocarbon radicals or at least one hydrocarbon radical and one hydrogen, as well as an electron-attracting group, such as an alkoxy, halogen, organic nitrogen or sulfur radical, etc., may be used.

Other suitable reducing materials include the alkali and alkaline earth metals, their alloys, hydrides and their alkyl and/or aryl compounds, as well as quite generally the alkyl and aryl derivatives of other metals which have sufficient stability to permit reaction in their compound form with a reducible heavy metal compound.

Heavy metal compounds suitable for the purposes of the invention include such inorganic compounds as the halides, oxyhalides, complex halides, oxides, hydroxides, and organic compounds such as alcoholates, acetates, benzoates and acetyl acetonates of the transition metals of the IV, V, VI and VII periods of the periodic system, e.g. titanium, zirconium, hafnium, thorium, uranium, vanadium, niobium, tantalum, chromium, molybdenum, tungsten and manganese, as well as iron and copper. The metal halides, particularly the chlorides, are generally preferred, titanium and zirconium being the most active of these metals. The following heavy metal compounds are relatively readily reducible requiring only relatively low activating temperatures: titanium tetrabromide, titanium tetrachloride and zirconium acetylacetonate. The relatively difficultly reducible compounds include ferrous chloride, chromic chloride and manganese chloride. Also pre-reduced heavy metal compounds, such as $TiCl_3$ and/or $TiCl_2$ may be used as this catalyst component. Catalysts which are made by mixing metal alkyl with a reducible transition metal compound, for example, gallium triethyl+zirconium acetyl acetonate or zinc diethyl+chromyl chloride may be used for the polymerization of olefins other than ethylene, such as propylene, dienes, etc.

Particularly striking results have been obtained by applying the present invention to ethylene polymerization carried out with catalysts prepared by reacting triethyl aluminum, diethyl aluminum chloride or mixtures of diethyl aluminum chloride with triethyl aluminum as the reducing agent with titanium tetrachloride as the heavy metal component. These catalysts may be pretreated at carefully controlled temperatures for about 5 to 20 minutes or longer. The optimum pretreating temperature for a catalyst prepared from diethyl aluminum chloride and titanium tetrachloride lies between about 40° and 65° C. However the beneficial effect of the olefins added in accordance with the present invention is independent of this preconditioning treatment.

The catalysts are quite generally prepared by intimately mixing the aluminum compound or other reducing component and the heavy metal compound preferably in a solvent or diluent and in a non-oxidizing atmosphere while stirring. Paraffinic hydrocarbons, such as heptane or other saturated petroleum or synthetic hydrocarbon oils, are the most suitable solvents. When the modifying olefins of the invention are added to these catalyst mixtures care should be taken that the catalyst components had time to react before the modifying olefin is added.

The molar ratio of the aluminum compound to the heavy metal compound in the catalyst mixture may vary widely. As pointed out above, the higher the polymer molecular weight desired the higher should be this ratio. A preferred molar ratio of alkyl aluminum compounds to titanium tetrachloride for making polymers above 20,000 molecular weight is about 0.5 to 6:1, molar ratios of 0.3 to 12:1, being suitable in many cases. If desired, control of this molar ratio may be used to counteract any undesirable molecular weight decrease caused by the olefin addition of the invention. Thus, in order to maintain a given molecular weight while, at the same time, increasing the added olefin concentration, it may be desirable to increase the Al/Ti ratio.

The polymerization process in accordance with the invention is carried out at conditions normally used heretofore in the low pressure polymerization of olefins to prepare high molecular weight polymers suitable as "plastics" and for similar purposes. These conditions depend somewhat on the specific olefin involved and on the type of polymer desired. Ethylene and propylene are the preferred olefins although higher olefins, such as butylenes, pentenes, diolefins, etc., may be used alone or in mixtures. In the case of ethylene or propylene, the polymerization may be carried out by intimately contacting the gaseous feed olefin with the catalyst, for example by bubbling the olefin into a suspension of the catalyst in an inert solvent or diluent. The feed olefin may also be supplied in the liquid state or dissolved in a suitable inert diluent which may contain the modifying olefin of the invention. Neither the polymerization temperature nor the polymerization pressure is particularly critical. It is preferred, however, to operate at temperatures of about 0° to 150° C., such as 25° to 90° C.

Pressures ranging anywhere from atmospheric or subatmospheric to 250 atmospheres have been used heretofore in the low pressure polymerization of ethylene and other olefins on catalysts of the type described above. Similar pressures may be used for the process of the invention.

The reaction is preferably carried out under careful exclusion of oxygen while stirring in batch or continuous operation. When operating batchwise, introduction of the olefin to be polymerized is continued until the catalyst is exhausted and the reaction ceases. In order to permit stirring even after the formation of substantial amounts of solid polymer solvents or diluents are used as indicated above. These diluents which should be liquid at the operating conditions include aliphatic, hydro-aromatic and aromatic hydrocarbons, such as pentane, hexane, higher paraffins, cyclohexane, tetrahydronaphthalene, decahydronaphthalene, benzene, xylene, halogenated aromatic hydrocarbons, e.g. mono- or di-chlorobenzenes; ethers such as dibutyl ether, dioxane, tetrahydrofurane; and mixtures thereof. The polymer concentration in the reaction mixture may be about 10 to 40%.

The amount of catalyst used may vary within wide limits depending somewhat on the purity of the olefin feed. Proportions of as little as 0.1 part by weight of catalyst per 1,000 parts by weight of olefin are sufficient if the feed is pure. With olefin feed streams containing about 0.01% of water, oxygen, carbon dioxide or certain other oxygenated compounds, catalyst proportions of about 0.5 to 5 wt. percent are usually adequate.

Upon completion of the polymerization reaction, the catalyst is completely deactivated, e.g. by the addition of an alcohol, such as isopropyl alcohol or n-butyl alcohol in amounts of about 10 to 100 times the amount of catalyst used. The reaction slurry may then be filtered, the filter cake reslurried in a catalyst solvent, such as dry, concentrated alcohol at about 50° to 100° C. for 15 to 60 minutes, filtered again and the filter cake dried, preferably under reduced pressure. Ash residues in the polymer are reduced below about 0.05% by this procedure.

The polymers produced by the present invention are, in many respects, superior and in all respects at least equal to those produced by conventional low pressure polymerization processes, particularly at molecular weights below about 100,000. This and other more specific aspects of the invention will be best understood by reference to the following specific examples.

EXAMPLE I

A series of runs were made in a batch unit employing 2 to 6 grams of 1/1 Al/Ti mol ratios of diethyl aluminum chloride-titanium tetrachloride catalyst, pretreating the catalyst in 400 cc. of sodium-dried n-heptane diluent for 15 minutes at 130° F., diluting with 2200 cc. of n-heptane diluent and polymerizing scrubbed ethylene at a rate of 82 l./hr. for periods up to greater than 5 hours at temperatures of 135° to 140° F. Runs I and II were made, respectively, with 1.4% of octene-1 on diluent, added in the ethylene feed and in diluted catalyst solution after the catalyst pretreatment step. Comparative results with addition of branched chain type olefin, i.e. di-isobutylene, in ethylene feed and diluted catalyst solution were determined in runs III and IV, respectively. Comparison of the data with typical base run V are summarized in Table I.

*Table I*

| Run No. | I | II | III | IV | V |
|---|---|---|---|---|---|
| Wt. Percent Octene-1: | | | | | |
| Diluent | [2]1.4 | 1.4 | | | 0 |
| Feed | 8.7 | 0.0 | | | 0 |
| Wt. Percent Di-Isobutylene: | | | | | |
| Diluent | | | [2]1.95 | 1.4 | 0 |
| Feed | | | 21.6 | 0 | 0 |
| Time of Runs, Hrs. | 13.0 | 5.33 | 1.67 | 1.67 | 3.33 |
| Wt. Percent Slurry @ End | 10.3 | 17.4 | | | 13.4 |
| Slurry Type | Easily Stirrable | | | | Thick Slurry |
| Polymer: | | | | | |
| Gm./Hr./Gm. | 22.5 | [1]21.4 | 26.8 | 19.3 | [1]27.1 |
| Harris Mol Wt.×10⁻³ | 63 | 70 | 214 | 322 | [1]106 |
| Wt. Percent Film Polymer [3] | 0.5 | 0.06 | 1.5 | | 2.3 |

[1] Shut down voluntarily.
[2] Calculated value on basis of olefin in ethylene feed.
[3] On total polymer.

The data indicate no differences between introducing octene-1 in the ethylene stream or in the catalyst solution. The addition of di-isobutylene results in a lower catalyst efficiency and higher molecular weight and in this respect differs from the addition of a straight chain olefin, such as octene-1. The octene runs are attended by high slurry concentrations, easily stirrable slurries, and much lower film polymer formation.

EXAMPLE II

Several series of batch runs were made at standard conditions given below:

| | |
|---|---|
| 1/1 mol ratio $(C_2H_5)_2AlCl/TiCl_4$ catalyst, gms. | 1.32 |
| n-Heptane diluent (alumina and sodium dried), cc. | 1,000 |
| Catalyst pretreating | None |
| Flushing of hot diluent at 155° F. with 92 l./hr. of scrubbed ethylene feed, minutes | 15 |
| Reaction temperatures, ° F. | 143–144 |
| Reaction time, hrs. | 2 |
| Scrubbed ethylene rate, l./hr. | 92 |
| Stirring rate, r.p.m. | 500 |

Octene-1 was added to the diluent in varying proportions. The results are summarized in Table II.

*Table II*

| Run No. | VI | VII | VIII | IX | X [1] |
|---|---|---|---|---|---|
| Wt. Percent Octene-1 on Diluent | 0.0 | 0.7 | 1.4 | 3.0 | 1.4 |
| Wt. Percent Slurry at End | 9.9 | 6.8 | 8.1 | 6.0 | 10.7 |
| Type Slurry | Stiff Slurry Difficult to Stir. | Thin Easily Stirrable Slurries | | | |
| Gm./Hr./Gm. | 25 | 17 | 20.4 | 15.1 | 27.3 |
| Harris Mol. Wt.×10⁻³ | 73 | 50 | 36 | 26 | 47.5 |
| Wt. Percent Film Polymer | 2.4 | 2.0 | 0.18 | Too Small to Measure. | 0.4 |
| Wt. Percent Soluble Polymer [2] (on total polymer) | | 2.4 | 2.7 | 9.8 | 6.7 |

[1] 200 cc. of catalyst solution pretreated 30 minutes at 110° F. prior to dilution and addition of octene-1.
[2] Recovered by chilling reaction mixture after recovering other polymer by filtration. Mol. wt. was 6300 in run VIII.

The data in Table II show the effect of addition of increasing amounts of octene-1 to the diluted catalyst solution from 0.7 to 3.0% concentration on the catalyst efficiency, polymer molecular weight and film polymer formation. The data in runs VI–IX with non-pretreated catalyst show a definite decrease in film polymer, more stirrable slurries, and lower molecular weight polymer with increasing octene-1 concentration. Addition of octene-1 in run X with pretreated catalyst likewise shows the beneficial effects of lower molecular weight, thin stirrable slurry concentrations and lower film formation. Comparison of runs VII, VIII and IX also shows the effect of soluble polymer formation on reactor fouling.

EXAMPLE III

Several ethylene polymerization runs were carried out in a 1-liter continuous unit and in a 2 gallon continuous unit with and without the addition of 0.25% of octene-1 in n-heptane diluent employing 0.16–0.19% by weight concentration on diluent of 0.5/1 mol ratio aluminum triethyl/$TiCl_4$ catalyst at standard polymerization conditions of about atmospheric pressure and about 140°–145° F. temperature. The essential conditions and results of these runs are summarized in Table III below.

Table III

| Run No. | XI | XII | XIII | XIV | XV | XVI |
|---|---|---|---|---|---|---|
| Unit | 1-Liter Continuous Unit | | | 2 Gallon Continuous Unit | | |
| Al Alkyl | Aluminum Triethyl | | | Aluminum Triethyl | | |
| Al/Ti Ratio | 0.5 | 0.5 | 0.5 | 0.49 | 0.46 | 0.44 |
| Wt. percent Octene-1 on Diluent | 0 | 0.25 | 0.25 | 0 | 0.25 | 0.25 |
| Slurry Concentration, Wt. Percent | 9.4 | 10.5 | 11.0 | 9.0 | 9.0 | [2] 5.0 |
| Type Slurry | Thick Voluminous Slurry | Thin Easily Stirrable | | Thick | Fairly Fluid | |
| Reaction Rate, Gm./Hr./Gm | 80 | 73 | 62 | 55 | 39 | 38 |
| Mol Wt. (Melt Index) ×10⁻³ | 61 | 47 | 60 | 80 | 83 | 83 |
| Fouling Factor [1] | 10.3 | 1.2 | 2.2 | 5.0 | 2.5 | 1.2 |
| Polymer Density, gm./cc | 0.07 | 0.22 | 0.27 | | | |

[1] Wt. percent total polymer formed remaining as film in reactor at end of run.
[2] Lower slurry concentration due to lower catalyst concentration, 0.12 vs. 0.16–0.19% in other runs in 1-liter and 2 gal. units.

The data bring out vividly the reduction in film formation and the improvements in slurry stirrability from the addition of as little as 0.25% of octene-1 in the diluent.

EXAMPLE IV

The relative effects of alpha-olefins other than octene-1, including hexene-1 and tetradecene-1 were determined in single standard batch runs. Ethylene polymerization conditions were substantially as listed in Example III. The effects of adding 1.4% of representative alpha-olefins are summarized in Table IV.

Table IV

| Run No. | VI | XVII | XVIII | XIX |
|---|---|---|---|---|
| Alpha-Olefin Added | None | Octene-1 | Hexene-1 | Tetradecene-1. |
| Wt. Percent Olefin on Diluent | 0.0 | 1.4 | 1.4 | 1.4. |
| Reaction Rate, Gms./Hr./Gm | 25 | 20.6 | 19.6 | 41. |
| Mol. Wt.×10⁻³ | 73 | 36 | 48 | 59. |
| Film Polymer, Wt. Percent | 2.4 | 0.18 | 2.5 | 0.05. |
| Mol Olefin/Mol Polymer | 0 | 87 | 83 | 3.4. |
| Slurry Concentration at End, Wt. Percent | 9 | 7.5 | 7.0 | 19.5. |
| Nature of Slurry | Fairly Thick | Thin Slurry | Thin Slurry | Thin, easily stirrable. |

The effect of the different alpha-olefins added as regards olefin consumption during polymerization, film polymer formation and mole of olefins per mol of polymer is evident. Preliminary conclusions from the data indicate that so far as reduction in film polymer formation octene-1 and tetradecene show an advantage over hexene-1 addition. Also it is noted that more of the lower olefins polymerize or copolymerize with the ethylene as determined by recovery and analyses of the hydrocarbon layer from the product work-up.

EXAMPLE V

Four standard batch polymerization runs (XX–XXIII) with ethylene feed were made employing 0.5–1/1 mol ratio of untreated aluminum triethyl/titanium tetrachloride catalyst substantially at the polymerization conditions of Example III. The effects of the addition of 0.5–1.4% of octene-1 on film polymer formation and catalyst activity were determined. Complete data are summarized in Table V.

Table V

| Run No. | XX | XXI | XXII | XXIII |
|---|---|---|---|---|
| Alpha-Olefin Added | None | Octene-1 | Octene-1 | Octene-1. |
| Wt. Percent Olefin on Diluent | | 1.4 | 0.5 | 0.5. |
| Al/Ti Mol Ratio | 0.5 | 0.5 | 1.0 | 0.5. |
| Total Catalyst Concentration, Gms./Liter | 1.049 | 1.569 [1] | 1.29 [2] | 1.049. |
| Reaction Rate, Gm./Hr. Gm. | 47.8 | 1.9 | 7.8 | 32.6. |
| Mol. Wt.×10⁻³ | 69 | | 985 | 33. |

[1] Initial catalyst addition 1.049 gm. of 0.5/1 mol ratio Al/Ti gave no reaction; added 0.52 gms. of 0.5/1 Al/Ti catalyst at 70 minutes and a slight polymerization reaction occurred.
[2] No reaction or precipitate occurred with original 1.049 gms. of 0.5/1 Al/Ti catalyst during initial 30 minutes; added 0.24 gms. additional Al (C₂H₅)₃ catalyst to increase Al/Ti ratio to 1/1; brown precipitate formed and some polymerization occurred.

Distinctive differences from addition of octene-1 in the diluent to the aluminum triethyl-titanium tetrachloride system were noted. In runs XXI and XXII when the catalyst mixture in 200 cc. of diluent was added to the remaining 800 cc. of diluent containing the octene-1 which had been preheated to 150° F. and saturated with ethylene feed, none of the brown precipitate often connected with efficient polymerization was noted even after 30 minutes. Further addition of aluminum triethyl or 0.5/1 aluminum alkyl/titanium mixture resulted in precipitate formation and some polymerization activity.

These observations indicate that the chemical activity of the aluminum triethyl is markedly affected by the added octene-1. However, when the catalyst precipitation is obtained at room temperature prior to the addition of the diluent containing the octene-1, and ethylene is then introduced, good polymerization activity is obtained.

Comparison of the data below indicates the same beneficial effect of octene-1 on formation of fine polymer particles and thin slurry as noted above with the diethyl aluminum chloride-titanium tetrachloride catalyst system.

Table VI

| Run No. | XV | XXIII |
|---|---|---|
| Wt. Percent Octene-1 on Diluent | 0.0 | 0.5. |
| Reaction Rate, Gms./Hr./Gm | 47.8 | 32.6. |
| Mol. Wt.×10⁻³ | 69 | 33. |
| Slurry Concentration @ End, Wt. Percent | 13 | 7. |
| Nature of Slurry @ End | Very Thick | Thin. |

EXAMPLE VI

Six batch propylene polymerization runs of 1 hour duration were completed in a 2-liter glass reactor. The procedure consisted in pretreating 0.5/1 mol. ratio aluminum triethyl/titanium tetrachloride catalyst in concentration of 20 gm./liter for 1 hour at about 70° C., adding additional aluminum triethyl in heptane diluent, saturated with propylene, to bring the Al/Ti ratio to 2/1 and total catalyst concentration to 3.6 gm./liter at the start. The polymerization was conducted with propylene gas feed rate of 92 liters/hour and the reaction temperature was maintained in the range of 90°–108° F. At the end of each run, 500 cc. of 99.96% isopropyl alcohol containing 5% of acetyl acetone was added and the mixture was heated with agitation for 0.5 hr. at 140°–150° F., cooled and transferred to a filter funnel. Next an additional 500 cc. of isopropyl alcohol acetyl acetone solution was added and the polymer was filtered. The polymer was washed with acetone containing acetyl acetone and finally with acetone containing approximately 0.2–0.3% of an acyl amino phenol type oxidation inhibitor, and air dried. Phillips pure and research grades of propylenes and a propylene which had been hydro-treated over a hydrogenation catalyst at 500 and 1000 h./v./hr. for removal of propadiene and methyl acetylene, were used as feed stocks. Data on the effect of the addition of 0.5% of octene-1 and tetradecene-1 were obtained and are summarized in Table VII.

Table VII

| Run No. | XXIV | XXV | XXVI | XXVII | XXVIII | XXIX |
|---|---|---|---|---|---|---|
| Variable Studied | Cat. Conc. | | Olefin Add. | | Treated Propylene Feed | |
| Cat. Concentration, Gm./Liter | 3.6 | 1.8 | 3.6 | 3.6 | 1.8 | 1.8. |
| 0.5% Olefin on Diluent | 0 | 0 | Octene-1 | Tetradecene-1 | 0 | 0. |
| Propylene Hydro Treatment over Catalyst, V./V./Hr. | (Phillips pure grade Propylene) | | (Phillips Research Grade Propylene) | | 500 | 100. |
| Reaction Rate, Gms./Hr./Gm | 35 | 45 | 34.6 | 31 | 32 | 26. |
| Mol. Wt.×$10^{-3}$ | 119 | 119 | 89 | 100 | 86 | 79. |
| Calc. Total Oxide Ash, Wt. Percent | 0.008 | 0.007 | 0.005 | | 0.004 | |
| Slurry Conc. @ End, Wt. Percent | Very Thick | Fairly Thick | Very Thick | Fairly Thick | Fairly Thick. | Fairly Thick. |

Decreasing the catalyst concentration in run XXV resulted in improved catalyst efficiency with no change in molecular weight. Addition of 0.5% of octene-1 lowered the polymer molecular weight from 120,000 to 90,000 without affecting the catalyst efficiency. Tetradecene addition in 0.5% concentration slightly lowered the catalyst activity but results in a polymer more easily broken up and less rubbery in nature, and in a slurry concentration of 14%, which was about as stirrable as that obtained in run XXV with only half the catalyst concentration. Runs with hydro-treated propylene feed indicated lower catalyst efficiency and lower molecular weight polymer due to impurities other than oxygen (4 p.p.m. in alkyl scrubbed feed). However, the latter polymer products are more rubber-like in character.

The invention is not limited to the specific figures of the foregoing examples. The relative proportions of the materials used and the reaction conditions may be varied within the limits indicated in the specification and the appended claims.

What is claimed is:

1. In a slurry process of polymerizing ethylene at polymerization conditions in an inert organic liquid diluent with a catalyst system of titanium tetrachloride and an alkyl aluminum reducing compound the improved method of reducing film formation and improving the stirrability of the resulting slurry reaction mixture which comprises carrying out the polymerization in the presence of 0.01 to 3 wt. percent, based on the weight of liquid diluent, of an alpha straight chain monoolefin having from 6 to 14 carbon atoms, the diluent being present in an amount to give a reaction mixture containing from 10 to 40% polymer.

2. The process of claim 1 in which said higher olefin is added in an amount of about 0.1 to 1.5% by weight of said diluent.

3. The process of claim 1 in which said alpha olefin is octene-1.

4. The process of claim 1 in which said alpha olefin is tetradecene.

5. The process of claim 1 in which said amount of the added higher olefin is so controlled within the range of about 0.01–3.0% by weight of said diluent that the bulk density of the dry product polymer formed by said polymerization is at least 0.2.

6. The process of claim 1 in which said alpha olefin is dissolved in said diluent and added to the reduced catalytic heavy metal compound before the start of the polymerization reaction.

7. The process of claim 1 in which said aluminum compound is diethyl aluminum chloride.

8. The process of claim 1 in which said diluent is a hydrocarbon liquid at said conditions.

9. The process of claim 8 in which said diluent is n-heptane.

References Cited in the file of this patent

UNITED STATES PATENTS

| | | |
|---|---|---|
| 2,474,671 | Hersberger | June 28, 1949 |
| 2,717,888 | Feller et al. | Sept. 13, 1955 |
| 2,824,089 | Peters et al. | Feb. 18, 1958 |
| 2,827,447 | Nowlin et al. | Mar. 18, 1958 |
| 2,833,755 | Coover | May 6, 1958 |
| 2,839,518 | Brebner | June 17, 1958 |
| 2,850,488 | Baxter et al. | Sept. 2, 1958 |
| 2,879,263 | Anderson et al. | Mar. 24, 1959 |
| 2,886,561 | Reynolds et al. | May 12, 1959 |
| 2,905,645 | Anderson et al. | Sept. 22, 1959 |

FOREIGN PATENTS

| | | |
|---|---|---|
| 533,362 | Belgium | May 16, 1955 |
| 538,782 | Belgium | Dec. 6, 1955 |

OTHER REFERENCES

Webster's International Dictionary (2nd Edition), published by G. & C. Merriam Company (Springfield, Massachusetts), 1960, page 1697.